(12) United States Patent
Grannan et al.

(10) Patent No.: US 7,533,158 B2
(45) Date of Patent: May 12, 2009

(54) SYSTEM AND METHOD FOR HANDLING DIGITAL CONTENT DELIVERY TO PORTABLE DEVICES

(75) Inventors: Michael Grannan, Austin, TX (US); Lalitha Suryanarayana, Austin, TX (US); David Patron, Cedar Park, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 0 days.

(21) Appl. No.: 10/346,722

(22) Filed: Jan. 17, 2003

(65) Prior Publication Data

US 2004/0143652 A1 Jul. 22, 2004

(51) Int. Cl.
*G06F 15/16* (2006.01)
(52) U.S. Cl. .................................... 709/219
(58) Field of Classification Search ................ 709/231, 709/248, 217, 218, 219; 455/436; 370/331, 370/350; 717/173, 178
See application file for complete search history.

(56) References Cited

U.S. PATENT DOCUMENTS

| | | | |
|---|---|---|---|
| 6,243,581 B1 | 6/2001 | Jawanda | |
| 7,046,657 B2 * | 5/2006 | Harrington et al. | 370/350 |
| 7,085,744 B2 * | 8/2006 | Morrison | 705/71 |
| 7,165,173 B1 * | 1/2007 | Herle | 713/151 |
| 7,379,958 B2 * | 5/2008 | Karhu | 709/201 |

(Continued)

FOREIGN PATENT DOCUMENTS

GB 2 301 744 12/1996

(Continued)

OTHER PUBLICATIONS

Stemberger, S., "Syncing data: An introduction to SyncML", http://www-106.ibm.com/developerworks/wireless/library/wi-syncml/, Oct. 2001.*

(Continued)

*Primary Examiner*—Douglas B Blair
(74) *Attorney, Agent, or Firm*—Toler Law Group

(57) ABSTRACT

The present disclosure is directed generally to a method and system to handle downloads of digital data files to portable computing devices. In a particular embodiment, the system includes a first system access point responsive to a first wireless access point at a first location; a second system access point responsive to a second wireless access point at a second location; and a central facility. The central facility includes a computer having a user sign-on module to permit wireless download access to digital data files by a portable device within communication range of at least one of the first wireless access point and the second wireless access point. The central facility includes a digital data file download status memory, the status memory including an indication of download status and including an indication of the portion of a requested digital data file that has been downloaded. In a particular embodiment, the method includes starting a download of digital data from a server to a portable computing device, the portable computing device in remote communication with the server via a wireless communication channel. The method further includes determining that the download is interrupted prior to completion of the download digital data and storing data associated with a user of the portable computing device and data associated with the download of digital data in a status registry memory.

17 Claims, 5 Drawing Sheets

U.S. PATENT DOCUMENTS

| | | |
|---|---|---|
| 2002/0010758 A1 | 1/2002 | Chan |
| 2002/0021689 A1* | 2/2002 | Robbins et al. ............. 370/352 |
| 2002/0062385 A1* | 5/2002 | Dowling ..................... 709/230 |
| 2002/0085719 A1* | 7/2002 | Crosbie ...................... 380/248 |
| 2002/0143971 A1* | 10/2002 | Govindarajan et al. ...... 709/230 |
| 2002/0157036 A1* | 10/2002 | Nakamura ..................... 714/4 |
| 2003/0084165 A1* | 5/2003 | Kjellberg et al. ............ 709/227 |
| 2003/0236864 A1* | 12/2003 | Lai ............................ 709/219 |
| 2004/0054650 A1* | 3/2004 | Chun ............................ 707/1 |
| 2004/0203684 A1* | 10/2004 | Jokinen et al. .............. 455/418 |
| 2004/0205263 A1* | 10/2004 | Sivaraman et al. ........... 710/21 |

FOREIGN PATENT DOCUMENTS

| | | |
|---|---|---|
| GB | 2 359 450 | 8/2001 |
| WO | WO 03/039009 | 10/2002 |

OTHER PUBLICATIONS

Supplementary European Search Report under Article 157(2)(a) EPC, European Application No. 04701329.7-2413 (PCT/US2004000552), Nov. 7, 2007, (4 pgs).

* cited by examiner

DIGITAL FILE DOWNLOAD STATUS REGISTRY

| DEVICE ID 202 | USER ID 204 | CONTENT ID 206 | BYTE COUNT 208 | FILE SIZE 210 | ACCESS TIME STAMP 212 | DESTINATION URL 214 |
|---|---|---|---|---|---|---|
| DEVICE #1 | USER #1 | DVD # | A | F1 | T1 | D1 |
| DEVICE #2 | USER #2 | CD # | B | F2 | T2 | D2 |
| DEVICE #3 | USER #3 | SOFTWARE FILE | C | F3 | T3 | D3 |
| DEVICE #4 | USER #4 | MUSIC FILE | D | F4 | T4 | D4 |

FIG. 2

SYSTEM AND METHOD FOR HANDLING DIGITAL CONTENT DELIVERY TO PORTABLE DEVICES

FIELD OF THE DISCLOSURE

The present application relates generally to a method and a system for digital data file downloads to portable devices.

BACKGROUND

While wireless data networks are available at certain locations where portable computer users congregate, such as at certain coffee houses and airports, such networks have not provided ubiquitous coverage. As a result, the systems to support a digital economy where digital files may be communicated and purchased by mobile consumers has not been deployed. It would be desirable for portable computing device users to select, purchase and download digital content conveniently and without unduly restricting the user's mobility.

Accordingly, there is a need for an improved method and system of handling downloads of digital data files to portable devices.

SUMMARY OF THE INVENTION

The present invention relates generally to a method and system for handling downloads of digital data files to portable computing devices. In a particular embodiment, the system includes a first system access point responsive to a first wireless access point at a first location; second system access point responsive to a second wireless access point at a second location; and a central facility. The central facility includes a computer having a user sign-on module to permit wireless download access to digital data files by a portable device within communication range of either the first wireless access point or the second wireless access point. The central facility includes a digital data file download status memory, the digital data file download status memory including an indication of download status and including an indication of the portion of a requested digital data file that has been downloaded.

In another particular embodiment, the system is coupled to a first wireless access point via a first network and coupled to a second wireless access point via a second network. The system includes a server computer having a mobile user sign-on module to permit wireless download access to digital data files by a portable device within communication range of the first wireless access point and a second portable device within communication range of the second wireless access point. The system also includes a digital data file download status memory, the status memory including at least one field to store an entry to indicate the portion of a requested digital data file that has been downloaded to a first portable computing device via the first wireless access point.

In another particular embodiment, the method includes starting a download of digital data from a server to a portable computing device, the portable computing device in remote communication with the server via a wireless communication channel. The method also includes determining that the download is interrupted prior to completion of the download of digital data and storing data associated with a user of the portable computing device and data associated with the download of digital data in a status registry memory.

In a further embodiment, a method of operating a computer network with access to digital data content available for download is disclosed. The method includes determining that a portable device is in communication with a first wireless access point coupled to the computer network, the first wireless access point at a first location; authenticating the portable device and the user; receiving a selection from the portable device of digital data content to be downloaded; starting a download of the digital data content to the portable device via the first wireless point; determining that the download of the digital data content is interrupted prior to completion; determining that the portable device is in communication with a second wireless access point coupled to the computer network, the second wireless access point at a second location; re-authenticating the portable device; re-authenticating the user; optionally prompting the portable device with an option to continue the download of the digital data content; and restarting the download of the digital data content to the portable device via the second wireless access point at the point in the digital data content where the download was interrupted.

BRIEF DESCRIPTION OF THE DRAWINGS

FIG. 2 is a general diagram that illustrates a digital data file download status registry memory.

DETAILED DESCRIPTION OF THE DRAWINGS

Figure 1:
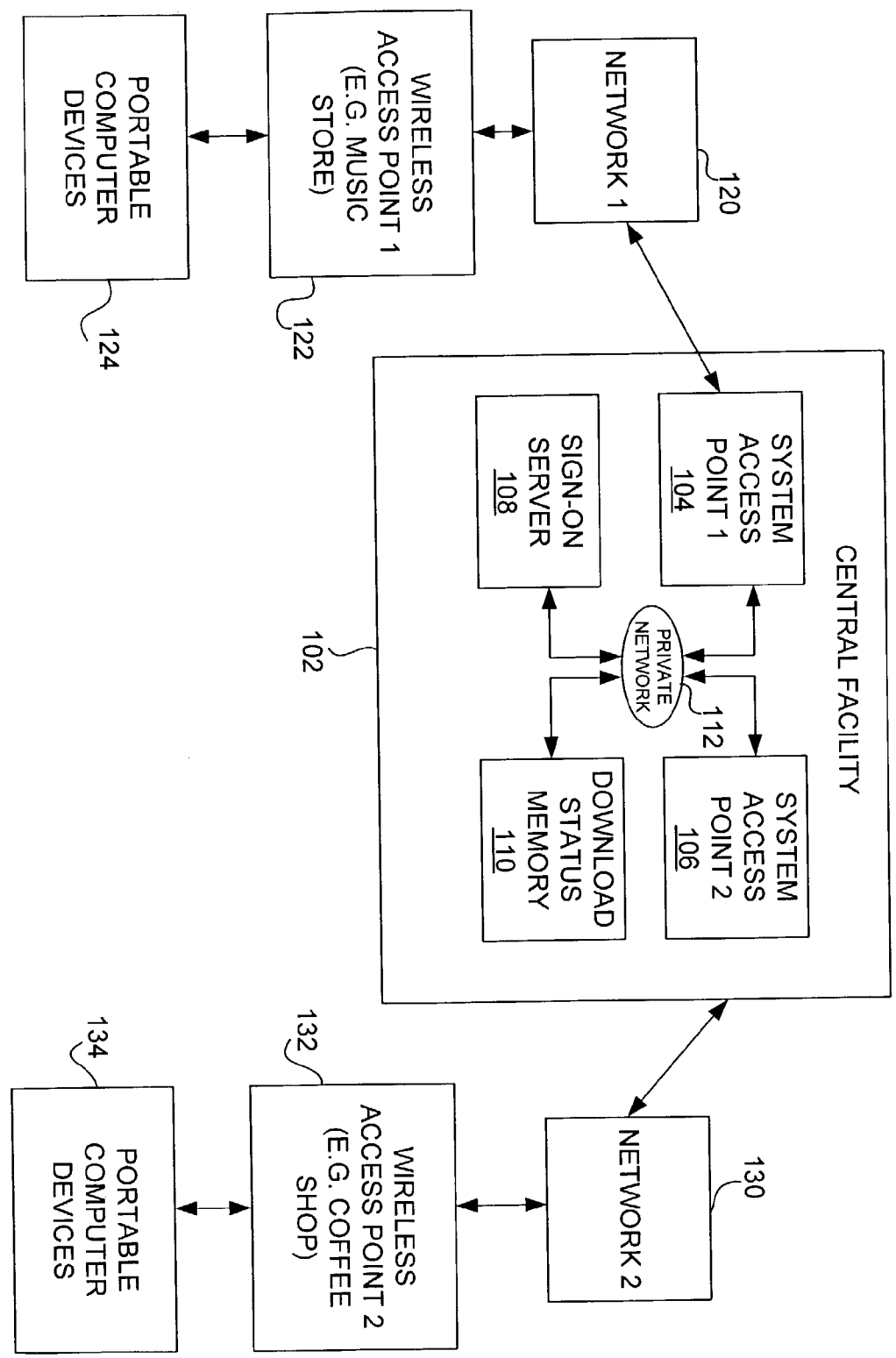
FIG. 1 is a block diagram that illustrates an embodiment of a system that may be used to download digital data files to portable devices.

Referring to FIG. 1, a wireless communication system is illustrated. The wireless communication system includes a central facility 102, a first network 120, a first wireless access point 122, a second network 130, and a second wireless access point 132. The first wireless access point 122 provides a range of wireless communication coverage for portable computer devices 124. Similarly, the second wireless access point 132 provides a range of wireless communication coverage for certain portable computing devices 134. Such wireless coverage may be provided by a wireless network, such as the industry standard 802.11 type of wireless data network. The central facility 102 includes a first system access point 104, a second system access point 106, a sign-on server 108, and a download status memory registry 110. The first and second system access points, the sign-on server, and the download status memory are interconnected and coupled via an internal private network 112.

During system operation, a portable computing device, such as a first representative portable computer device 124 may receive access to the first network 120 via the first wireless access point 122. As an example operation, the portable computer device 124 may request a download of certain digital data files. In this scenario, the user request from the portable computer device 124 is fed from the wireless access point 122 through the first network 120 to the first system access point 104. At this point in the operation a request is made to authenticate the portable computer device user and the device 124 via the sign-on server 108. Upon authenticating and providing authorized access to the user and the device, a request may be processed for accessing a selected digital data file, such as a music CD-ROM file selection. After receiving the request the server within the central facility provides the access to the digital data file selected and starts downloading the file from the first system access point 104 to the portable computer device user 124 via the first network 120 and the first wireless access point 122. During the digital download a user of the portable device 124 may move locations such that the user becomes out of range from the first wireless access point 122. In this scenario, the digital download has not been completed and therefore has been interrupted. At the point of interruption, the amount of data that has been communicated and downloaded to the portable computing device 124 is stored within the download status memory 110. In addition, the download status memory may include other information regarding the download such as the device ID, the user ID, the selected content ID, file size, time stamp and a destination URL.

After a period of time where the portable computing device has been out of range, the user may return to either the same wireless access point 122 or may travel to a new wireless access point such as the second wireless access point 132. After regaining access to the communication system, the portable computing device user may request continuation of the partially downloaded data file. Alternatively, the continuation of the download may automatically occur. In an illustrative scenario, the portable device and the user is reauthenticated by the sign-on-server 108 through the second network 130 and the second system access point 106. After reauthentication, the digital data file download is restarted at the point in the file where the prior interruption took place. Thus, the remainder of the digital data file is downloaded from the central facility to the portable computing device via the second network 130 and the second wireless access point 132. An example of a location for the second wireless access point 132 is within a coffee shop or other community center that provides convenient access to wireless computing users. While the portable computing devices 124 and 134 have different numerical indications they may represent the same physical portable device or may represent different portable devices having access to the respective wireless access points 122, 132.

Referring to FIG. 2, an example of further details of a digital file download status registry memory 200 is shown. The download status registry 200 may include a plurality of different data fields characterizing the particular digital file download. The status registry may include representative fields such as a device identification (ID) 202, a user ID 204, a digital content ID 206, byte count 208, file size 210, last access timestamp 212, and destination URL 214. The download status registry 200 also includes a plurality of row entries that identify different devices and users that may have access to different digital files being downloaded. The byte count field 208 indicates the number of bytes that have been downloaded to the user. This byte count is then saved when the mobile user download is interrupted and then may be recalled from memory to restart the download at the point of interruption. Also shown, the digital download may include a variety of different types of content such as DVDs, CDs, software files, and other types of digital content that may be represented as downloaded data.

Figure 3:
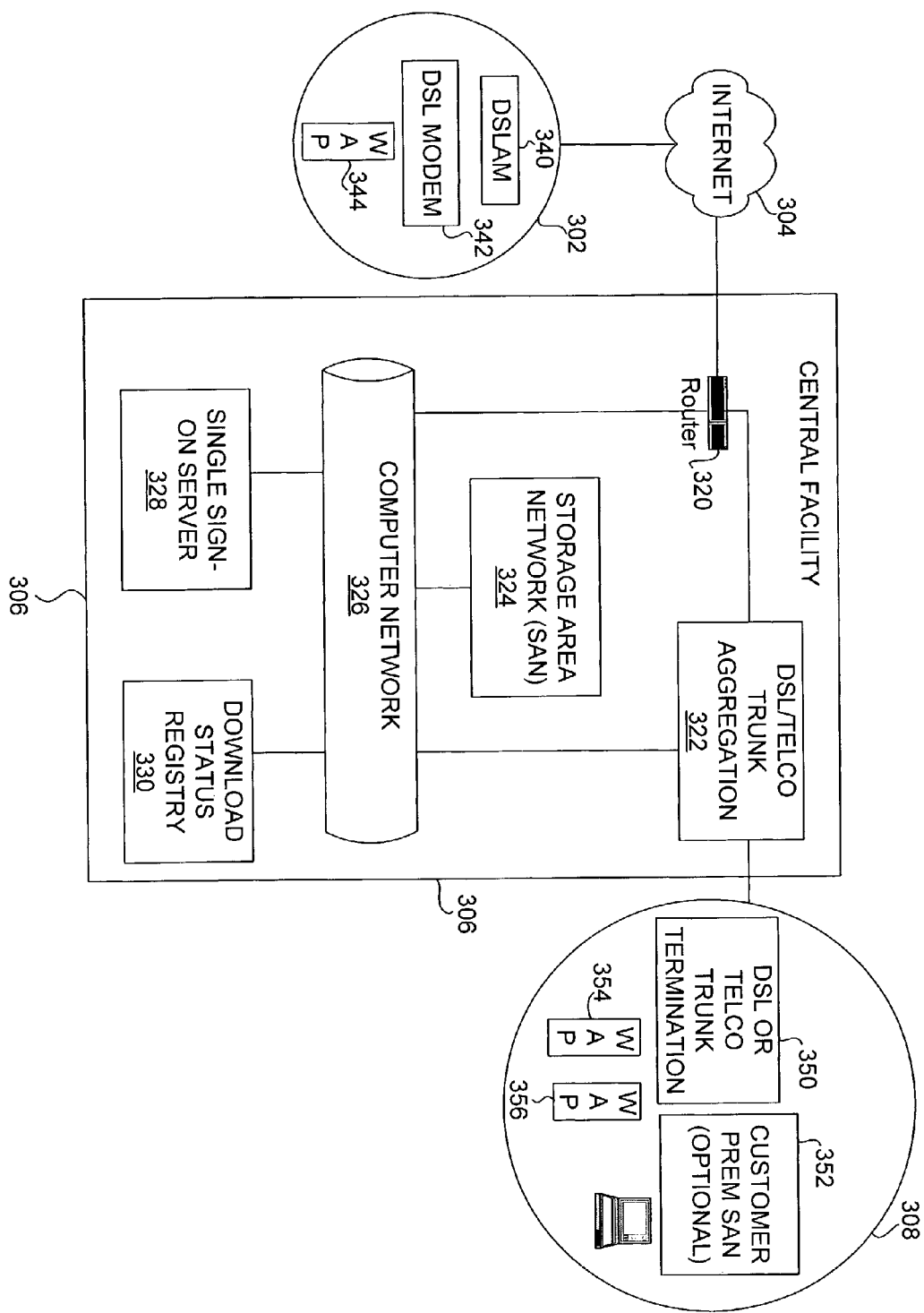
FIG. 3 is a block diagram that illustrates a further detailed embodiment of a system that may be used to download digital files to portable devices.

Referring to FIG. 3, a further detailed example implementation of a representative communication system including a download status registry and having a download suspension and resumption capability is illustrated. With this implementation, a central facility 306 is provided. The central facility 306 is coupled to a first network point 302 via the internet 304. The central facility 306 is also directly connected to a second network point 308. The first network point 302 includes a representative digital subscriber line access multiplexer (DSLAM) 340, a digital subscriber line (DSL) modem 342, and a wireless access point (WAP) interface 344. The second network point 308 includes a DSL or telephone company trunk termination 350, a customer storage unit 352, and multiple wireless access point interfaces 354 and 356. The central facility 306 includes an internal router 320, a DSL/TELCO trunk aggregation unit 322, a computer network 326, and a storage area network (SAN) 324. The computer network 326 interconnects a single sign-on server 328 and the download status registry 330. The illustrated system may be used to determine what portion of a digital data file that has been previously downloaded to a particular portable device from the central serving authority and also provides for communication failures and lack of access, such as due to portable device movement out of range from a wireless access network. Thus, the system supports a seamless download of requested digital content when wireless subscribers roam between various locations that are supported by a federation of different wireless networks with a centralized user authentication capability. In a particular embodiment, the download status registry 330 may be implemented using a SyncML compliant server and associated client processes.

Figure 4:
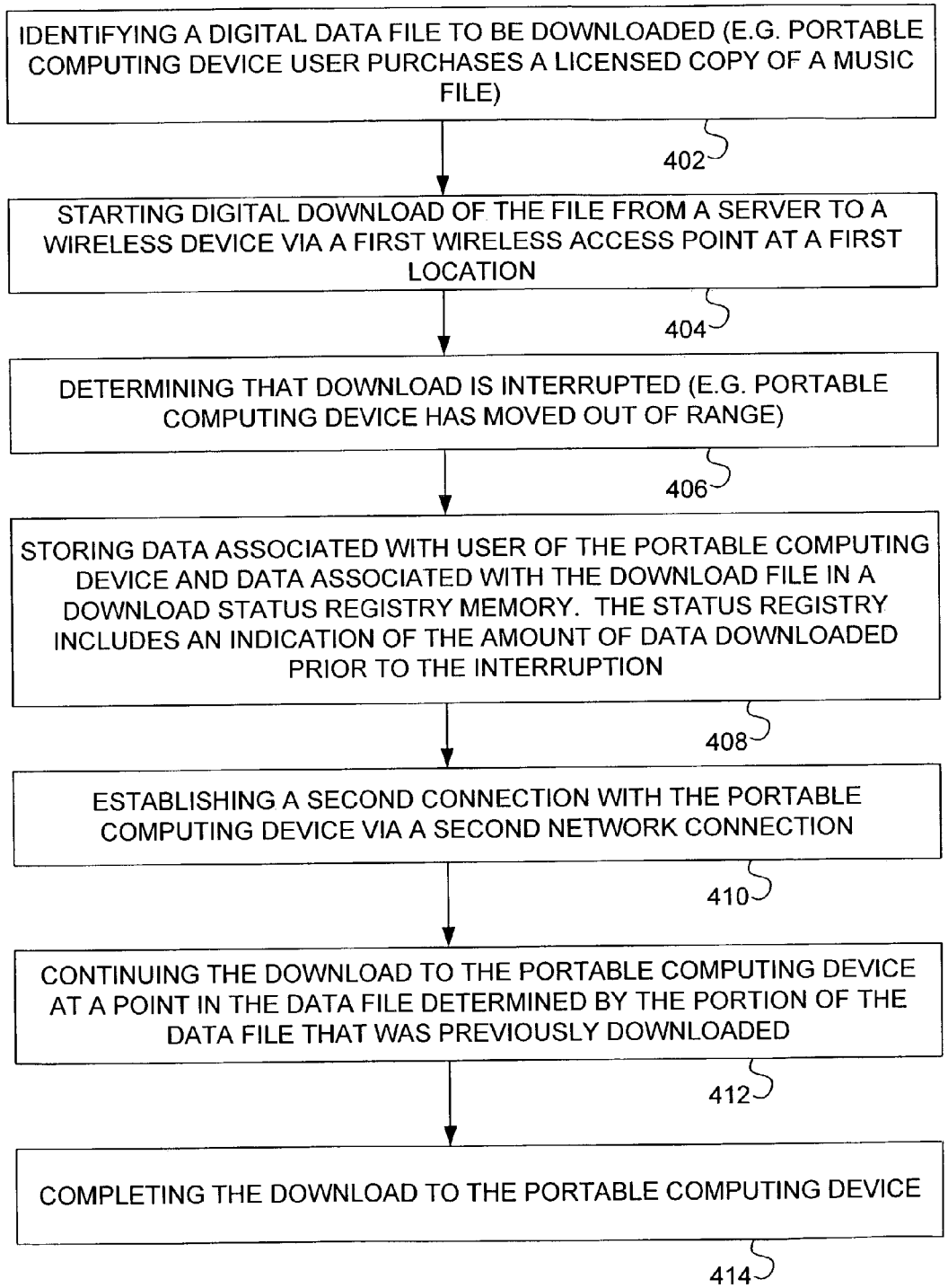
FIG. 4 is a flow chart that illustrates an embodiment of a method of handling digital data file downloads to portable devices.

Referring to FIG. 4, a method of using the illustrated systems is shown. During operation, a digital data file to be downloaded may be identified, at 402. An example is where a portable computing device user purchases a particular licensed copy of a music file. Other digital data that may be downloaded includes video content, software, application synchronization data, and software upgrades. The digital download of the selected file is then started at a server to the portable computing device via a first wireless access point at a first location at 404. At a certain point during the download it is determined that a download has been interrupted, at 406. An example of such interruption may be caused when a portable device has moved out of range from the first wireless access point. After determination of the interruption, such as by use of a timer or other detection mechanism, the data associated with the user of the portable computing device and data associated with the download file and its download progress is stored in a download status registry memory. The status registry memory includes an indication of the amount of data downloaded prior to the interruption, at 408.

At a later time after the portable computing device returns to a communication range of a wireless access point, a second connection with the portable computing device is established, such as via a second network connection at 410. This second network connection could be the original wireless access point, such as where a portable device user returns to the original location or where the first connection was lost and later re-established for other reasons. Alternatively, the second network connection may be a second wireless access point or may be an entirely different alternate download network, such as a wide area data network or direct network such as a local area network (LAN). After establishing the second connection, the download of the digital data file may be continued to the portable computing device at the point in the data file that is determined based on the portion of data that was previously downloaded, at 412. The download to the portable computing device of the remainder of the digital data file is then completed, at 414. It should be noted that a download can be discontinued one or more times.

Figure 5:
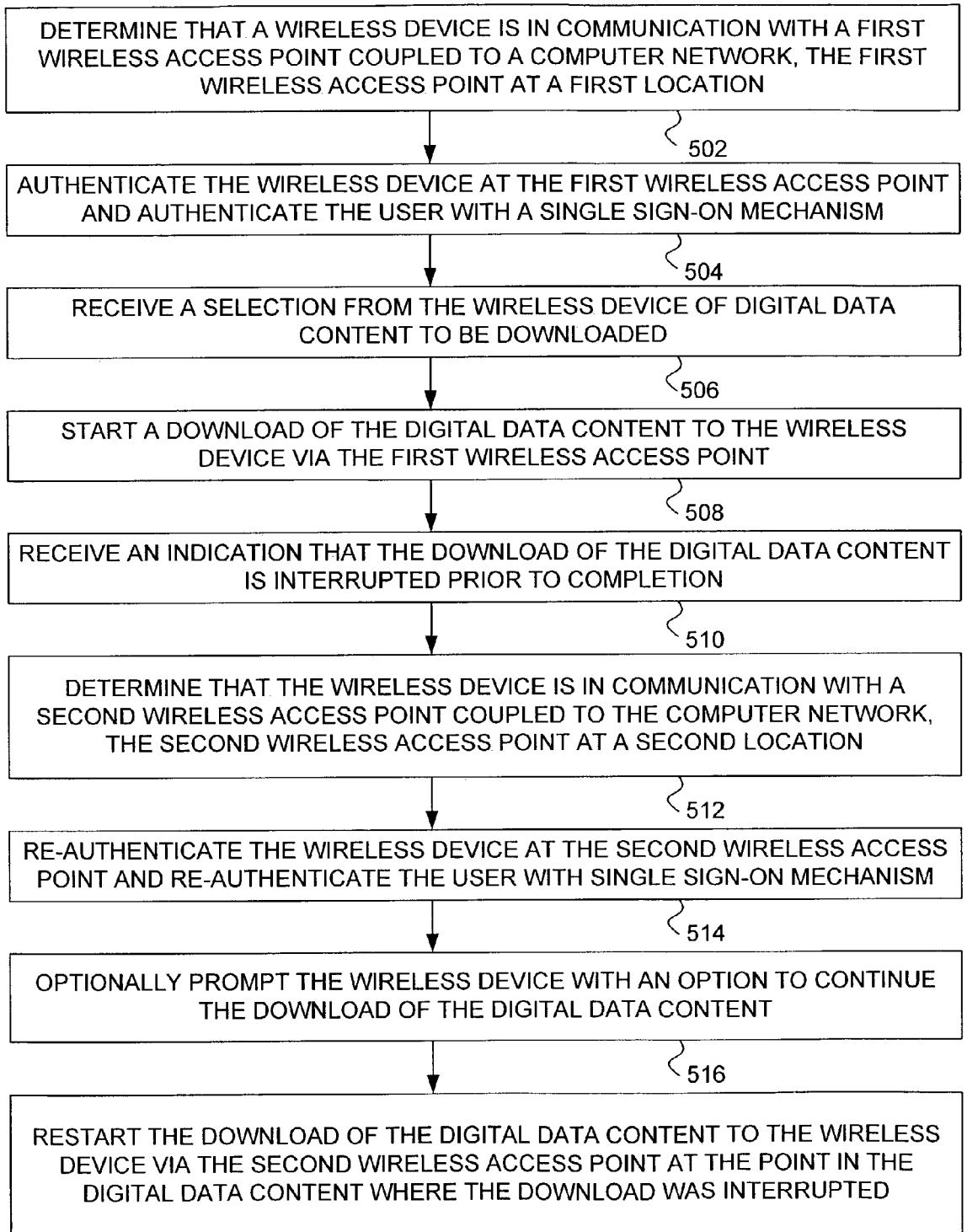
FIG. 5 is a flow chart that illustrates another embodiment of a method of handling digital data file downloads to portable devices.

Further details of a method of using the illustrated systems are disclosed in FIG. 5. Referring to FIG. 5, a first step in a representative method of operation is to determine that a portable computing device is in communication with a first wireless access point coupled to a computer network, at 502. The first wireless access point is at a first location. The portable device is then authenticated at the first wireless access point and the user is also authenticated by a single sign-on server mechanism, at 504. A selection of digital content is received from the portable device for a selected data file to be downloaded, at 506. The download of the digital data content is started, at 508. At some point during the download, an indication is received that the download of the digital data content has been interrupted prior to completion, at 510. At a later time, it is determined that the portable device is again in communication with and has access to the data server, such as via a second wireless access point connection at 512. The portable device is then re-authenticated at the appropriate access point and the user is also re-authenticated using the single sign-on mechanism, at 514. The portable device user may be optionally prompted to continue the download of the digital data content, at 516. If the continuation option is selected by the user, the download of the digital data content is restarted at the point in the digital data content file where the download was interrupted previously, at 518. To determine the point in the digital data content file for restart, the central facility may read the digital file download registry memory to determine the point to continue the download file. After the selected restart of the digital file download, the download to the portable computing device is completed and the portable computing device user then has access to the entire selected data content file.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system comprising:
   a first system access point responsive to a first wireless access point at a first location;
   a second system access point responsive to a second wireless access point at a second location, wherein the second location is remote from the first location; and
   a central facility, the central facility including a computer having a user sign-on module to permit wireless download access to digital data files by a portable device within communication range of the first wireless access point or the second wireless access point, the central facility including a digital data file download status memory, the digital data file download status memory including an indication of download status and including an indication of a portion of a requested digital data file that has been downloaded prior to a point of interruption;
   wherein the central facility is configured to automatically continue downloading the requested digital data file to the portable device from the point of interruption without receiving a request from the portable device to continue downloading the requested digital data file.

2. The system of claim 1, wherein the digital data file download status memory includes an entry that indicates a particular digital data file download is temporarily suspended due to a download interruption.

3. The system of claim 2, wherein the download interruption is in response to the central facility determining that the portable device has moved out of range for continued data communication.

4. The system of claim 1, wherein the central facility further includes a storage area network and wherein the digital data files to be downloaded are stored on the storage area network.

5. The system of claim 1, wherein the first and second system access points are network access connections selected from a wide area network and a direct network connection.

6. The system of claim 1, wherein the computer and associated portable devices are SyncML compliant and the SyncML protocol is used to facilitate discontinuous download of a digital data file.

7. The system of claim 1, wherein before resuming the download after establishing a connection with the second access point, a server communicates in real time with a portable device client to query its capabilities and carries out any capabilities negotiation that might be required for download purposes, such capabilities including available disk space.

8. The method of claim 1, wherein the first wireless access point is associated with a first range of wireless communication coverage, the second wireless access point is associated with a second range of wireless communication coverage, and the first range of wireless communication coverage is not adjacent to the second range of wireless communication coverage.

9. The method of claim 1, wherein the first system access point includes a digital subscriber line modem and a digital subscriber line access multiplexer coupled to a router of the central facility via the Internet and the second system access point includes a trunk termination point coupled to a trunk aggregation point of the central facility.

10. A method comprising:
    starting a download of digital data from a data server within a central facility to a portable computing device, wherein the data server downloads the digital data to the portable computing device via a first wireless access point coupled to a first network;
    determining that the download is interrupted prior to completion of the download of digital data;
    storing data associated with a user of the portable computing device and data associated with the download of digital data in a status registry memory coupled to the data server via an internal private network within the central facility;
    determining a point of interruption based on the data associated with the download of digital data in the status registry memory; and
    automatically continuing the download from the point of interruption, after the portable computing device resumes communication with the data server via a second network separate from the first network without receiving a request from the portable device to continue downloading the digital data.

11. The method of claim 10, wherein the download of the digital data is interrupted when the portable computing device moves outside a range of a wireless communication channel associated with the first wireless access point.

12. The method of claim 10, wherein the data stored in the status registry memory includes a byte count indicating an amount of data downloaded to the portable computing device prior to a download interruption.

13. The method of claim 10, wherein the second network includes a wide area data network connection, a local area network connection, or a second wireless access point connection.

14. The method of claim 10, further comprising completing the download of the digital data to the portable computing device.

15. The method of claim 10, wherein the status registry memory includes fields that identify devices, users, and content uniquely.

16. The method of claim 10, wherein the digital data includes downloadable software radio modules for configuring the portable computing device to support a new wireless data transmission protocol.

17. The method of claim 10, further comprising determining that a user associated with the portable computing device selected and purchased a licensed copy of the digital data prior to continuing the download.

* * * * *